United States Patent
Chou

(10) Patent No.: US 8,734,002 B2
(45) Date of Patent: May 27, 2014

(54) FRAME OF BACKLIGHT MODULE

(75) Inventor: Yun-Yu Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 239 days.

(21) Appl. No.: 13/316,467

(22) Filed: Dec. 10, 2011

(65) Prior Publication Data

US 2013/0058132 A1 Mar. 7, 2013

(30) Foreign Application Priority Data

Sep. 1, 2011 (TW) .............................. 100131407 A

(51) Int. Cl.
*F21V 7/10* (2006.01)
(52) U.S. Cl.
USPC ........ 362/634; 362/632; 362/633; 362/23.09; 362/23.16; 362/97.4; 349/58; 349/60
(58) Field of Classification Search
USPC .......... 362/23.09, 23.16, 97.4, 632, 633, 634; 349/58, 60
See application file for complete search history.

(56) References Cited

U.S. PATENT DOCUMENTS

| | | | | |
|---|---|---|---|---|
| 1,882,647 | A * | 10/1932 | Kanolt | 40/716 |
| 6,595,651 | B2 * | 7/2003 | Jeong et al. | 362/600 |
| 7,178,967 | B2 * | 2/2007 | Kim | 362/633 |
| 7,192,177 | B2 * | 3/2007 | Chang et al. | 362/631 |
| 7,360,942 | B2 * | 4/2008 | Kim et al. | 362/632 |
| 7,377,682 | B2 * | 5/2008 | Chang et al. | 362/633 |
| 7,445,371 | B2 * | 11/2008 | Ma et al. | 362/633 |
| 7,726,867 | B2 * | 6/2010 | Jing | 362/633 |
| 7,796,211 | B2 * | 9/2010 | Yu | 349/65 |
| 2007/0241991 | A1 * | 10/2007 | Tsai | 345/7 |
| 2008/0007972 | A1 * | 1/2008 | Kuo | 362/633 |

* cited by examiner

*Primary Examiner* — Ismael Negron
(74) *Attorney, Agent, or Firm* — Novak Druce Connolly Bove + Quigg LLP

(57) ABSTRACT

A frame of a backlight module includes a first side bar, a second side bar, a third side bar and a fourth side bar. The first side bar, the second side bar, the third side bar and the fourth side bar are connected end to end. The frame includes two contacting portions. One of the contacting portions is positioned at a corner of the first side bar and the second side bar, and the other one of the contacting portions is positioned at another corner of the first side bar and the fourth side bar.

7 Claims, 5 Drawing Sheets

FRAME OF BACKLIGHT MODULE

BACKGROUND

1. Technical Field

The present disclosure relates to backlights and, particularly, to a frame of a backlight module.

2. Description of Related Art

An LCD panel typically includes an LCD sheet and a backlight module for providing light for the LCD sheet. Following the popular trend of miniaturization of the LCD panel a decrease of thickness and weight continues, accordingly, the backlight module and the LCD sheet also should be sufficiently thin and light.

The LCD sheet typically includes two glass substrates and a number of LCD molecules between the two glass substrates. The backlight module typically includes a number of optical members in a frame, such as a light source, a reflector, a light guide plate, a diffusing sheet, for example. The optical members are mounted in the frame in a predetermined order. The frame keeps the optical members as a group and protects the optical members from being damaged. When first mounting the LCD sheet to the frame, the LCD sheet is tilted to be put into the frame, therefore, only a side of the LCD sheet may contact to the frame, and the force from the frame may act on a small area of the LCD sheet. The glass substrates of the LCD sheet may be easily broken during assembly, because the thinness of the LCD sheet.

What is needed therefore are a frame of a backlight module addressing the limitations described.

BRIEF DESCRIPTION OF THE DRAWINGS

The components of the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

Figure 1:
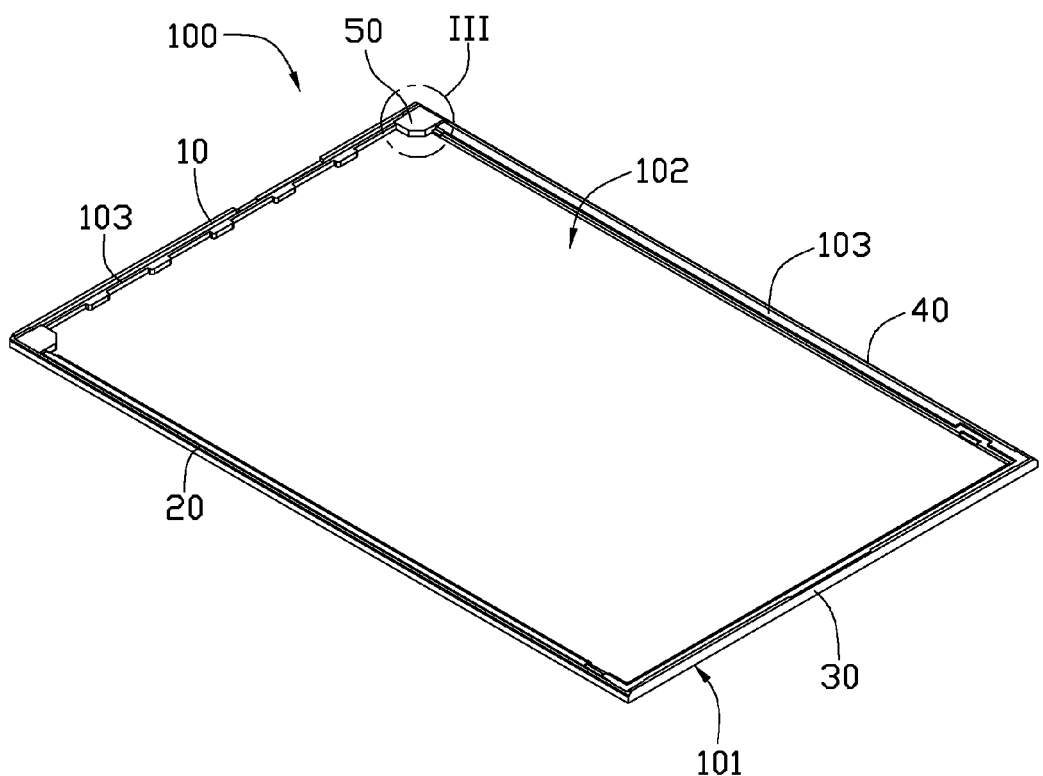
FIG. 1 is a schematic view of a frame of a backlight module, according to an exemplary embodiment of the present disclosure.
Figure 2:
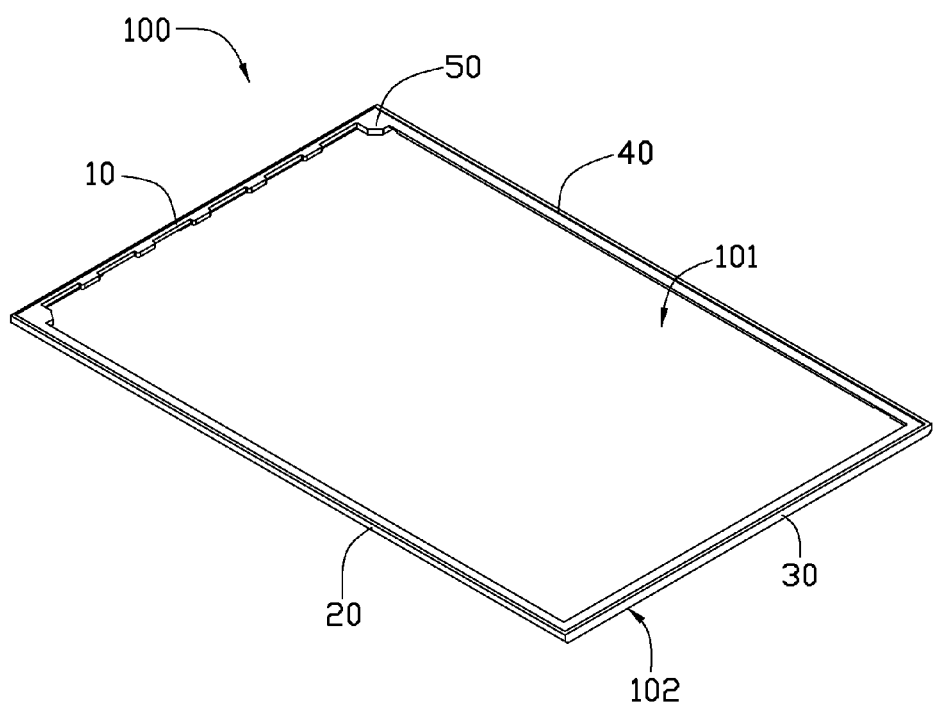
FIG. 2 is similar to FIG. 1, but showing the frame from another angle.

Referring to FIGS. 1-2, a frame 100 of a backlight module, according to an exemplary embodiment, is shown. The frame 100 includes a light incident side 101 and an opposite light emergent side 102.

The frame 100 includes a first side bar 10, a second side bar 20, a third side bar 30 and a fourth side bar 40. The first side bar 10, the second side bar 20, the third side bar 30 and the fourth side bar 40 are connected end to end. The first side bar 10 is substantially parallel to the third side bar 30, and the second side bar 20 is substantially parallel to the fourth side bar 40. The first side bar 10 and the third side bar 30 are substantially perpendicular to the second side bar 20 and the fourth side bar 40.

The frame 100 includes a step portion 103 at the light emergent side 102. The step portion 103 on the second side bar 20, the third side bar 30 and the fourth side bar 40 includes two steps, and the step portion 103 on the first side bar 10 includes one step.

In this embodiment, the frame 100 is made from rubber. The first side bar 10, the second side bar 20, the third side bar 30 and the fourth side bar 40 are integrally formed with each other.

Figure 3:
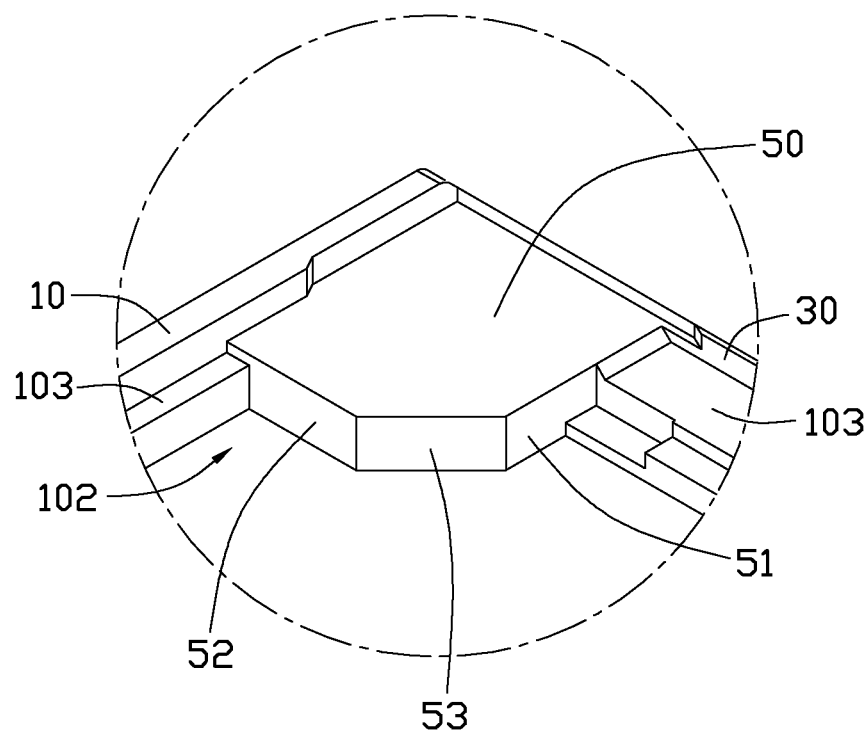
FIG. 3 is an enlarged view of part III of the frame of FIG. 1.

Referring to FIG. 3, the frame 100 includes two contacting portions 50 protruding to an inner space. One of the contacting portions 50 is formed at a corner between the first side bar 10 and the second side bar 20, and the other of the contacting portions 50 is formed at another corner between the first side bar 10 and the fourth side bar 40. The contacting portions 50 protrude from the step portion 103 to the light emergent side 102. Each contacting portion 50 includes a first edge 51, a second edge 52 and a third edge 53 connected between the first edge 51 and the second edge 52. The first edge 51 is substantially parallel to the first side bar 10, and the second edge 52 is substantially parallel to the second side bar 20. In this embodiment, a length of the first edge 51 is substantially equal to that of the second edge 52, and an angle between the first edge 51 and the third edge 53 is substantially equal to that between the second edge 52 and the third edge 53.

In another embodiment, the contacting portions 50 can be respectively formed at a corner between the second side bar 20 and the first side bar 10 and a corner between the second side bar 20 and the third side bar 30. In yet another embodiment, the contacting portions 50 can be respectively formed at a corner between the third side bar 30 and the second side bar 20 and a corner between the third side bar 30 and the fourth side bar 40. In still another embodiment, the contacting portions 50 can be respectively formed at a corner between the fourth side bar 40 and the third side bar 30 and a corner between the fourth side bar 40 and the first side bar 10. Furthermore, the frame 100 can form a contacting portion 50 formed at each corner.

Optical members (not shown), such as light source, reflector, light guide plate diffusing sheet, can be mounted in the frame 100 from the light incident side 101 in a predetermined order. The optical members are held between the first side bar 10, the second side bar 20, the third side bar 30 and the fourth side bar 40 of the frame 100.

Figure 4:
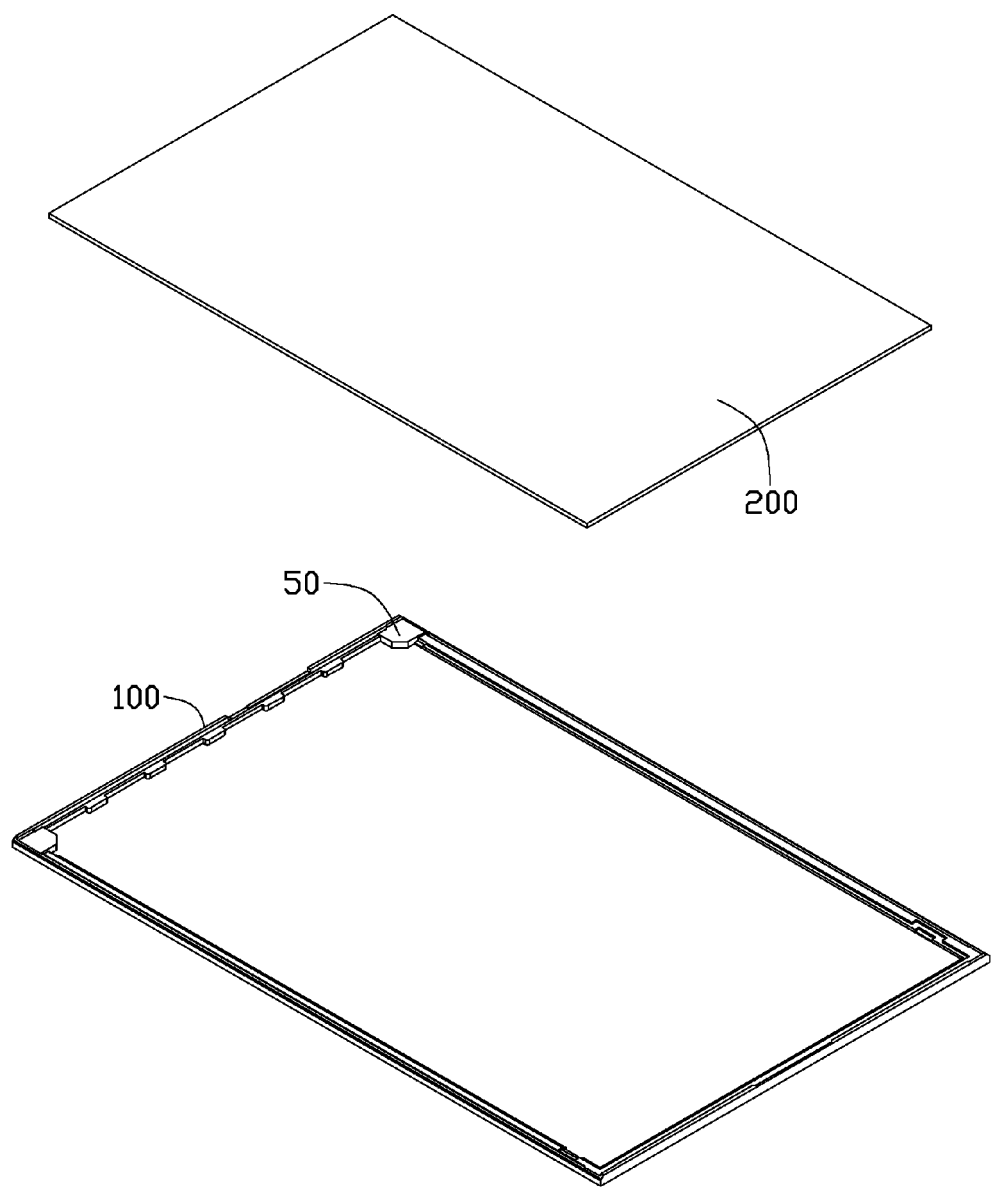
FIG. 4 and FIG. 5 are schematic views of mounting an LCD sheet to the frame of FIG. 1.
Figure 5:
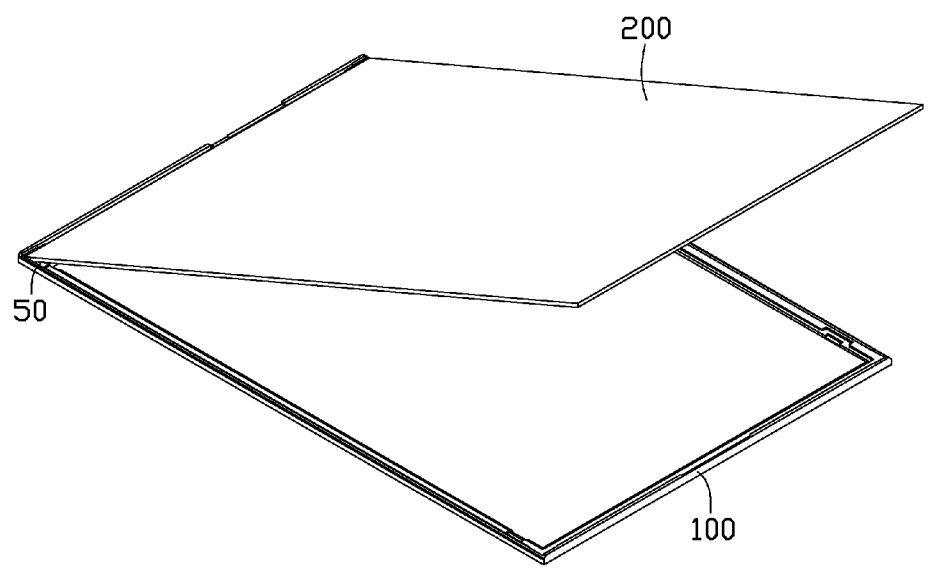

Referring to FIGS. 4-5, in assembly of a backlight module, an LCD sheet 200 is needed to mount in the frame 100 from the light emergent side 102. First, the LCD sheet is tilted to put in the frame 100, a side of the LCD sheet 200 is contacted to the contacting portions 50. Second, the LCD sheet 200 is adjusted to align with the frame 100. Then the LCD sheet 200 is pressed to attach to the frame 100.

The contacting portions 50 can increase a contacting area between LCD sheet 200 and the frame 100, thus can protect the LCD sheet 200 from being broken during assembly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A frame of a backlight module, comprising:
    a first side bar;
    a second side bar;
    a third side bar; and
    a fourth side bar;
    wherein the first side bar, the second side bar, the third side bar and the fourth side bar are connected to each other end to end, the frame comprises two contacting portions, one of the contacting portions is positioned at a corner of the first side bar and the second side bar, the other one of the contacting portions is positioned at another corner of the first side bar and the fourth side bar, each contacting portion comprises a first edge, a second edge and a third edge connected between the first edge and the second edge, the first edge is substantially parallel to the first side bar, and the second edge is substantially parallel to the second side bar.

2. The frame of claim 1, wherein the first side bar is substantially parallel to the third side bar, the second side bar is substantially parallel to the fourth side bar, and the first side bar and the third side bar are substantially perpendicular to the second side bar and the fourth side bar.

3. The frame of claim 1, wherein the frame is made from rubber.

4. The frame of claim 1, wherein the first side bar, the second side bar, the third side bar, and the fourth side bar are integrally formed with each other.

5. The frame of claim 1, wherein the frame comprises a light incident side, an opposite light emergent side, and a step portion positioned at the light emergent side, the contacting portions protrude a distance from the step portion towards the light emergent side.

6. The frame of claim 1, wherein a length of the first edge is substantially equal to that of the second edge.

7. The frame of claim 1, wherein an angle between the first edge and the third edge is substantially equal to that between the second edge and the third edge.

\* \* \* \* \*